March 16, 1943.  S. H. CALDWELL ET AL  2,313,989
TRACER FOR ELECTRICALLY CONTROLLED MACHINE TOOLS
Original Filed Dec. 15, 1939
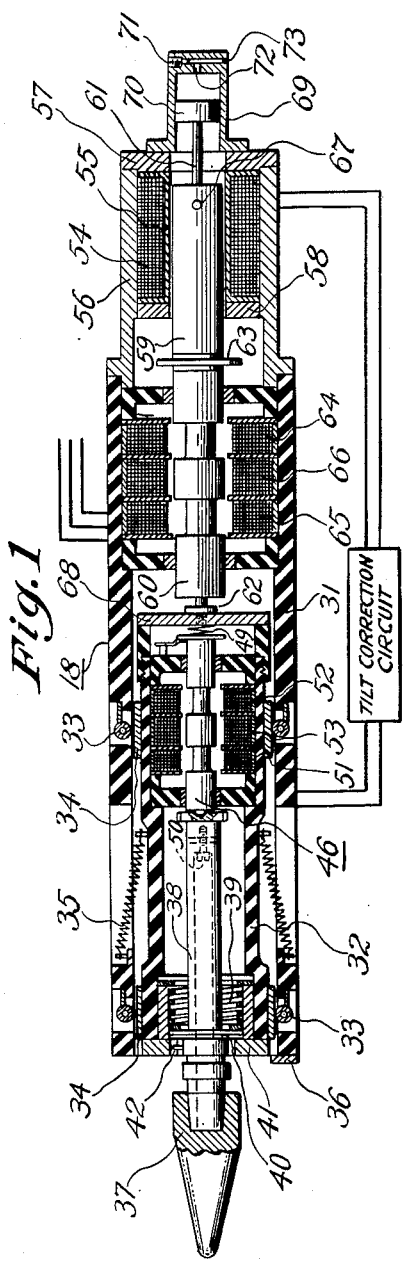
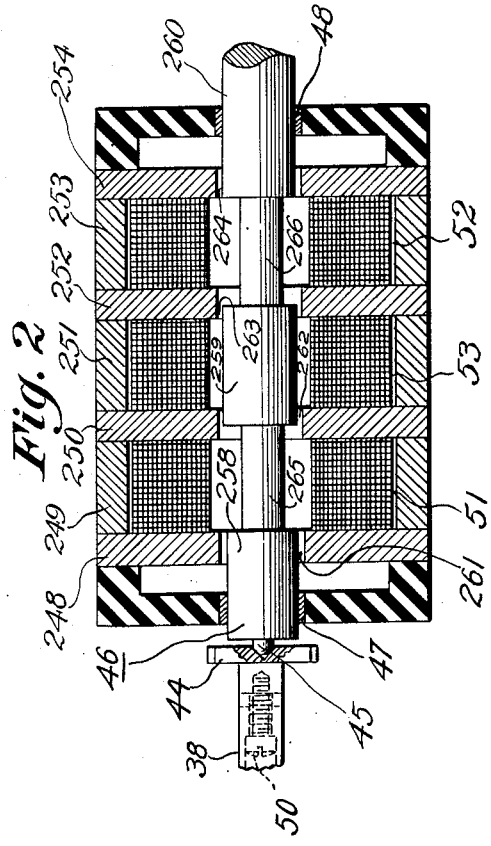
INVENTORS
S. H. Caldwell
J. J. Jaeger
R. Taylor
BY Joseph N. Schofield
ATTORNEY Patented Mar. 16, 1943

2,313,989

UNITED STATES PATENT OFFICE 2,313,989

TRACER FOR ELECTRICALLY CONTROLLED MACHINE TOOLS

Samuel H. Caldwell, Belmont, Mass., Jacob J. Jaeger, West Hartford, Conn., and Richard Taylor, Great Neck, N. Y., assignors to Niles-Bement-Pond Company, West Hartford, Conn., a corporation of New Jersey Original application December 15, 1939, Serial No. 309,434. Divided and this application February 1, 1941, Serial No. 377,042

6 Claims. (Cl. 90—62)

This invention relates to metal cutting machines and particularly to tracer controlled machines operated electrically and adapted to cut irregular shapes in metals such as bending and forging dies corresponding to a template or model thereof.

More particularly the invention relates to a new and improved form of tracer for machines such as shown and described in our pending application for an Electric control for machine tools, Serial No. 309,434, filed December 15, 1939, of which this application is a division.

An object of the present invention is to provide an improved form of tracer for a machine of the Keller die sinking type in which a model of the die or other part being formed is mounted for traversing by a tracer, the relative movements of the cutter and work blank being controlled through thermionic means energized by slight displacements of a portion of the tracer by contact with the model during its traversing movements.

A feature of the invention that is important is that when a part of the tracer is deflected slightly either laterally in any direction or axially backward, its movement serves to displace the pole piece of a pair of opposed electro-magnets and thereby unbalance induced voltages within windings of an adjacent or interposed induction coil, the resultant voltage within the last mentioned coil produced by the speed of movement of the pole piece and by its unbalanced position being employed as a signal in circuits for controlling movements of the tracer and cutter relative to the model and work piece.

With the above and other objects in view, the invention includes the features of construction and operation set forth in the following specification and illustrated in the accompanying drawing.

In the drawing:

Figure 1 is a longitudinal sectional view of a complete tracer made in accordance with the present invention; and Fig. 2 is an enlarged sectional view of a portion of the tracer shown in Fig. 1.

In the accompanying drawing annexed hereto and forming a part of this specification, we have shown the invention embodied in one form of tracer for a standard type of Keller die sinking machine, but it will be understood that the invention can be otherwise embodied and that the drawing is not to be construed as defining or limiting the scope of the invention, the claims appended to this specification being relied upon for that purpose.

In the above-mentioned drawing there has been shown but one form of tracer which is now deemed preferable, but it is to be understood that changes and modifications may be made within the scope of the appended claims without departing from the spirit of the invention.

When the tracer of the present form of Keller die sinking machines contacts the model and is thereby tilted or moved axially a contact is closed and one of a pair of electrical relays is operated which controls a motor to advance or retract the tracer and the cutter relative to the model and work piece. The transverse or leading motion of the tracer and cutter also is stopped while the cutter is moving in or out so that movements directly toward and from the work may be made. The transverse or leading motion is stopped in standard Keller machines regardless of the amount of correction required to accurately reproduce the form of the model. In the present invention the tracer does not open and close contacts but varies a voltage to speed up one motor and slow down another controlling movements of the machine members, this operation varying in degree as required by the particular correction or change of movement required. Also these movements may have their speeds controlled so that the speed of the cutter over the work may be any predetermined and substantially constant amount.

Briefly and in its broadest aspect, the invention may include the following principal parts: first, a tracer body in the form of a cylindrical sleeve; second, a tracer lever or spindle movable a slight distance axially and angularly in any direction; third, tilt detector coils; fourth, displacement detector coils; fifth, a displacement solenoid; and sixth, circuits between the tilt detector and displacement solenoid and from the displacement detector to the motors controlling movements of the machine elements.

Referring more in detail to the figures of the drawing, the tracer point 37, as seen in Fig. 1 when tilted by contact with a model, causes motion to the right of the tilt detector armature 46. The tilt detector includes a casing 32 bodily movable axially within the body portion 18 of the tracer and within which are mounted coils 51, 52 and 53 presently to be more fully described. Movement of the tilt detector armature 46 establishes the fact that contact with the model has been made, but does not directly influence the following or leading motions. If the slope of the surface of the model being traversed is small so that the tracer point 37 receives a considerable longitudinal component of force instead of being tilted, it will be shown later that this force causes correction to take place directly and without going through the intermediate stage of causing the tilt detector to operate. There is, however, a class of work in which the force required to move the tracer point 37 longitudinally or axially is not available, but a tilting action is easily obtained, and this is the more general situation, which is to be described.

As soon as a tilt of the tracer point 37 occurs, a voltage is produced in the coil 53 of the tilt detector, the voltage being dependent upon the amount of tilt produced. This voltage is introduced to an electrical circuit called the "tilt correction circuit" indicated in Fig. 1, which controls the action of a thermionic tube in this circuit which supplies power to a "displacement solenoid" 54 located within the main barrel of the tracer 18.

When the displacement solenoid 54 is energized, it withdraws an inner barrel 32 within the detector, and in so doing, withdraws the tracer point 37 from the model (not shown) by the amount necessary to cause the tracer point to reseat itself in a position parallel to the barrel of the tracer casing 18 and also parallel to the axis of the cutting tool. The motion produced by the energizing of the displacement solenoid 54 in straightening out the tracer point 37 is also transmitted to a second detector within the tracer, known as the "displacement detector." The amount of displacement which pole piece 60 of the displacement detector receives is the amount of motion which would have been produced if it were possible for the model to push only longitudinally on the tracer point 37 without tilting it. Hence, the motion of the displacement detector armature 46 is a true measure of the error in position of the cutting tool at the instant of consideration. It is an important object of the control system to work with as small a signal as possible and to obtain an effective signal with minimum tilt or axial movement of tracer point 37 to maintain a minimum error.

Referring more in detail to the cross section of the assembly of the tracer shown in Fig. 1, it will be seen that the main assembly is contained within the outer barrel or sleeve 31. An inner barrel 32 is free to slide within the outer barrel, and is supported upon rollers 33, which act against the flat plates 34, mounted on the inner barrel 32. Normally, the inner barrel is pulled toward the left as viewed in this figure by springs 35. The amount of this motion toward the left is limited by a stop 36, which acts against the edge of the flat plate 34.

The tracer point 37, the outer end of which engages the model being reproduced, is fitted upon and forms, in effect, an integral part of the tilting spindle 38. In order that the tilting spindle 38 may tilt in any direction, the spring 39 is used to force the circular disc 40 against a projecting seat 41. The tilting spindle 38 may, therefore, tilt about a pivot point located at any point upon the periphery of the face of the plate 40. The tilting spindle 38 is prevented from rotating by means of the pin 42 sliding in a suitable slot.

At the extreme right end of the tilting spindle 38 is mounted the flanged piece 44 which contains a central conical depression. This cone engages against a ball 45 which is mounted in the end of the armature 46 of the tilt detector. The armature 46 is constrained against sidewise motion by the bearings 47 and 48 and can only move longitudinally against the action of the spring 49. Any tilting of the spindle 38 therefore causes a longitudinal motion of the armature 46 because of the action of the ball and cone coupling.

In order to secure proper centering of the ball and cone joint when the plate 40 is flat against seat 41, the piece 44 which contains the cone may be made detachable from the spindle 38. By loosening the clamping screw 50 for plate 44 and applying pressure to the right end of the armature 46, the ball 45 will seat itself centrally in the cone and at the same time, the plate 40 will seat against seat 41 and the clamping screw can be tightened while the assembly is thus aligned.

The armature 46 is surrounded by two excitation coils 51, 52 and a pick-up coil 53, the action of which will be described at a later part of the specification.

The coil 54 referred to as a displacement solenoid is wound on a metallic bobbin 55, and located in the circular field structure consisting of the cylinder 56 and the two end plates 57 and 58. The armature 59 of the solenoid is drawn into the coil 54, that is toward the right as seen in Fig. 1, when excitation is applied to this coil. The pull of the displacement solenoid armature is transmitted by a pin 67 to the shaft 61 which passes through the solenoid armature 59 and the displacement detector armature 60. The shaft 61 at its left-hand end is fastened to the end plate 68 of the inner barrel 32 and locked by the nut 62. When the spindle 38 tilts and causes longitudinal motion of the armature 46 relative to the inner casing 32, a voltage is induced thereby in coil 53 and this voltage is used to effect excitation of the displacement solenoid 54 by the connection through the tilt correction circuit. This pulls the solenoid armature 59 into the coil 54, thereby pulling on the entire barrel 32 and moving the barrel and the spindle 38 back an amount necessary to enable the tilting spindle 38 to regain a seated position under the action of spring 39.

The armature 60 of the displacement detector is fastened to the armature 59 of the solenoid with a non-magnetic spacer piece 63 disposed between them. The spacer piece 63 is introduced to prevent magnetic flux from solenoid armature 59 passing into detector armature 60 and thereby causing false indications.

This displacement detector is shown in the central portion of the tracer casing, and has excitation coils 64 and 65 and a pick-up coil 66. Since the armature 60 of the displacement detector is mechanically coupled to the armature 59 of the displacement solenoid, any motion of the displacement solenoid armature 59 is directly transferred to the displacement detector armature 60. Since this motion is the amount of longitudinal motion required to reseat the tilting spindle 38, it is a measure of the longitudinal error shown by the position of the tracer point. Since the displacement detector produced a voltage proportional to its own motion, the output of the entire tracer assembly shown in Fig. 1 is a voltage proportional in magnitude and direction to the error shown by the position of the tracer point 37. This statement is correct when A.-C. excitation is applied to the coils 64 and 65 of the displacement detector. If, as will be seen in our above referred to application, combined A.-C. and D.-C. excitation is applied to these coils, the output of the tracer assembly in Fig. 1 is a voltage containing two components. The first is an A.-C. component, proportional in magnitude and direction to the error in position indicated by the tracer point 37. The second is a variable voltage which is a measure of the rate of change of the error as indicated by the tracer point.

If the slope of the portion of the surface of the model being followed by the tracer point is small, so that the tracer point is moved axially rather than tilted, the longitudinal motion is transferred directly to the inner barrel 32 by way of the springs 39 and 49. This motion then reaches the armature 60 by way of the rod 61, pin 67, solenoid armature 59 and spacer 63. If the combined action of the springs 49 and 39 is not sufficient to prevent motion of the spindle 38 relative to the barrel 32, the result is a displacement of the detector armature 46. The resulting signal voltage acts just as though the detector motion was due to tilting of spindle 38 and the displacement solenoid will aid in producing the displacement.

It is well-known that a system of masses and springs of the type shown in Fig. 1 is capable of oscillation. Sudden application of force by the solenoid is avoided to some extent by winding the coil 54 on the metallic bobbin 55. The bobbin acts as a short-circuited turn and currents induced in this turn retard the change of the rectified current in the coil 54. Mechanical vibration of the movable parts is checked by the dash pot 69, containing the piston 70 mounted on the rod 61. The effectiveness of the dash pot is controlled by the screw 71, which controls the size of the leakage path between the ports 72 and 73.

In the above description one tracer assembly and tilt detector and the movable parts therein have been referred to generally and their operation has been explained. This tracer will now be described in detail, particularly the tilt detector referred to above and shown in an enlarged sectional view in Fig. 2. The armature consists of the shaft 46, on which are mounted the cylinders or spools 258, 259 and 260. These cylinders may be integral parts of shaft 46 or mounted in position on the shaft. All parts of the armature and field structures are made of iron or steel having suitable magnetic properties. The field structure consists of the disc 248, the ring 249, the disc 250, the ring 251, the disc 252, the ring 253 and the disc 254 suitably retained in alignment and all being formed of iron or steel having the necessary magnetic qualities. The cylinders or heads 258, 259 and 260 on the armature are all of the same diameter and the central holes in the discs 248, 250 and 252 and 254 are in the particular embodiment shown all of another constant diameter. This arrangement forms a magnetic bridge which is excited by the coils 51 and 52 previously referred to, and coil 53 is the pick-up coil, but the functions of these two sets of coils may be interchanged.

The armature is shown in its balanced position in Fig. 2, when the central cylinder 259 is symmetrically located with respect to discs 250 and 252 and the cylinders 258 and 260 are symmetrically located with respect to discs 248 and 254, respectively. Under these conditions, the magnetic flux, due to coils 51 and 52, passes radially inwardly in equal amounts through discs 250 and 252, across the air gaps 262 and 263 and then longitudinally to the left and right repectively through cylinder 259, thence through shaft sections 265 and 266. Thus magnetic fluxes are balanced and no flux passes through cylinder 259.

It will be noted that cylinder 259 carries two components of magnetic flux, due to the coils 51 and 52 respectively, but these are polarized in opposite directions so that the resultant flux in cylinder 259 is the difference between the two components. The balance point of the magnetic bridge may now be defined electrically rather than by its centrally disposed relation to the discs and rings 248 to 254 by saying that it is the point at which the resultant flux through head 259 becomes zero. Under these conditions, the resultant flux linked by the pick-up coil 53 is zero.

If, now, the armature in Fig. 2 is moved slightly to the right, the reluctance of the air gap 263 between head 259 and disc 252 decreases and the reluctance of the air gap 262 between this cylinder and disc 250 increases. As shown in Fig. 2, the reluctance of air gap 261 between disc 248 and head 258 will remain substantially constant while the reluctance of air gap 264 between disc 254 and cylinder 260 will increase; by using suitable dimensions for the heads 258 and 260, these air gaps may both be made to change with mechanical motion also, so as to make the magnetic bridge more sensitive to mechanical motion. Following through the changes described when the armature is shifted slightly to the right, it will be observed that the flux due to coil 51 is increased, while the flux due to coil 52 is decreased, and that a portion of the flux due to the coil 51 will pass radially inwardly of the plate 252 and return through the cylinder 259. The flux passing through the head 259 is linked by coil 53, and a voltage is, therefore, induced in the latter coil. A voltage of opposite phase is induced if the armature 46 is shifted in the opposite direction from its balance point.

The detector thus described may also be operated with combined alternating and direct current excitation so as to produce a voltage in coil 53 which varies both with the position of the armature and with its velocity of movement. This voltage in coil 53 by means of the circuits shown and described in the above referred to application copending herewith is made use of to control the movements of the cutter relative to the work piece.

What we claim is:

1. A tracer assembly for controlling machine tool operating motors comprising in combination, a body member, a tracer point mounted therein for movement in any direction, electro-magnetic coils within said body member, an induction coil disposed adjacent said first mentioned coils, and a pole piece within said coils movable in one direction by movement in any direction of said tracer point, whereby movement of said tracer point and pole piece induces a resultant voltage in said induction coil.

2. A tracer assembly for controlling machine tool motors comprising in combination, a body member, a tracer point mounted therein for movement in any direction, electro-magnetic coils within said body member, an induction coil disposed adjacent said first mentioned coils, a pole piece within said coils movable axially by movement in any direction of said tracer point, whereby movement of said tracer point and pole piece induces a resultant voltage in said induction coil, and a solenoid energized by the voltage in said induction coil.

3. A tracer assembly for controlling machine tool operating motors comprising in combination, a body member, a tracer point mounted therein for movement in any direction, electro-magnetic coils within said body member, an induction coil adjacent said first mentioned coils, a pole piece within said coils movable in one direction by movement in any direction of said tracer point, whereby movements of said tracer point and pole piece induce variable voltages in said induction coil, a solenoid energized by the voltages in said induction coil, and means to retract said tracer point when said solenoid is energized.

4. A tracer assembly for controlling machine tool operating motors comprising in combination, a body member, a tracer point mounted therein for movement in any direction, electro-magnetic coils within said body member, an induction coil adjacent said first mentioned coils, a pole piece within said coils movable in one direction by movement in any direction of said tracer point, whereby movements of said tracer point and pole piece induce variable voltages in said induction coil, a solenoid energized by the voltages in said induction coil, an armature moved by said variable voltages, an electro-magnet adjacent said armature having an armature therein movable with said first mentioned armature, and an induction coil adjacent said last mentioned electromagnet whereby a voltage will be induced therein when said last mentioned armature is displaced.

5. A tracer assembly for controlling machine tool operating motors comprising in combination, a body member, a tracer point mounted therein for movement in any direction, electro-magnetic coils within said body member, an induction coil adjacent said first mentioned coils, a pole piece within said coils movable in one direction by movement in any direction of said tracer point, whereby movements of said tracer point and pole piece induce variable voltages in said induction coil, a solenoid energized by the voltages in said induction coil, an armature within said solenoid moved in one direction when said solenoid is energized, and means connecting said armature and tracer point, whereby said tracer point is retracted when said solenoid is energized and said armature moved.

6. A tracer assembly for controlling machine tool operating motors comprising in combination, a body member, a tracer point mounted therein for movement in any direction, electro-magnetic coils within said body member, an induction coil adjacent said first mentioned coils, a pole piece within said coils movable in one direction by movement in any direction of said tracer point, whereby movements of said tracer point and pole piece induce variable voltages in said induction coil, a solenoid energized by the voltages in said induction coil, an armature within said solenoid moved in one direction when said solenoid is energized, means connecting said armature and tracer point, whereby said tracer point is retracted when said solenoid is energized and said armature moved, a second pair of electro-magnetic coils having an induction coil adjacent thereto, a pole-piece for said second coils connected to said armature, whereby a voltage will be induced in said second induction coil when said tracer point is retracted.

SAMUEL H. CALDWELL.
JACOB J. JAEGER.
RICHARD TAYLOR.